(12) United States Patent  
Sawai et al.

(10) Patent No.: US 6,643,092 B2
(45) Date of Patent: Nov. 4, 2003

(54) MAGNETIC TAPE DEVICE

(75) Inventors: Kunio Sawai, Osaka (JP); Hiroshi Hamabata, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 138 days.

(21) Appl. No.: 09/933,287

(22) Filed: Aug. 20, 2001

(65) Prior Publication Data

US 2002/0024759 A1 Feb. 28, 2002

(30) Foreign Application Priority Data

Aug. 23, 2000 (JP) ........................................ 2000-006043

(51) Int. Cl.[7] ............................................ G11B 15/675
(52) U.S. Cl. ....................................................... 360/96.5
(58) Field of Search ......................................... 360/96.5

(56) References Cited

U.S. PATENT DOCUMENTS 5,349,482 A * 9/1994 Park ........................... 360/96.5
5,493,460 A * 2/1996 Lee ............................. 360/96.5
6,057,979 A * 5/2000 Sawai et al. ................ 360/96.5

FOREIGN PATENT DOCUMENTS

| JP | 3-125365 | 5/1991 |
| JP | 8-31064 | 2/1996 |
| JP | 63-50958 | 3/1998 |

* cited by examiner

Primary Examiner—Robert S. Tupper
(74) Attorney, Agent, or Firm—Rosenthal & Osha L.L.P.

(57) ABSTRACT

In a magnetic tape device, a tape cassette moving table 4 is placed between a pair of right and left guide plates 3a and 3b so as to be movable forward and backward (a and b). Rocking levers 8 which are engaged with the moving table 4, and a rotating cam 9 which is forward and reversely rotated by a driving source are interlockingly connected to each other via a slide plate 26. The rocking levers 8 are swung forward and backward (c and d) by the driving source via the rotating cam 9 and the slide plate 26 to move the moving table 4 forward and backward (a and b) between a cassette inserting position A and a cassette placing position B.

12 Claims, 12 Drawing Sheets

MAGNETIC TAPE DEVICE

BACKGROUND OF THE INVENTION

1. Field of the Invention

The present invention relates to a magnetic tape device which is simple in structure, which can be economically produced, and in which a tape cassette moving table can be smoothly moved forward and backward.

2. Description of the Related Art

Conventionally, techniques of a magnetic tape device are disclosed in JP-A-8-31064 and the like. An example of such techniques will be described with reference to FIGS. 14 to 16. In this example, a pair of right and left guide plates 3a and 3b stand in parallel on a chassis 2 in a case 1. A plurality of guide rods 5 which protrude from the side faces of a tape cassette moving table 4 placed between the guide plates 3a and 3b are movably passed through substantially L-like guide holes 6 that are opened in the guide plates 3a and 3b, so that the moving table 4 can be moved forward and backward (a and b) between a cassette inserting position A and a cassette placing position B. Rocking levers 8 which are pivotally attached to the guide plates 3a and 3b via pivot shafts 7 so as to be swung forward and backward (c and d) are engaged with the front guide rods 5, respectively. A worm gear 11 which is rotated by a driving source (not shown) meshes with a worm gear 10 which is formed in an outer peripheral face of a center portion of a rotating cam (rotating member) 9 that is rotatably disposed on the rear face of the chassis 2. A clutch gear mechanism 14 is used as an interlocking mechanism through which a bevel gear 12 formed in an upper outer peripheral face of the rotating cam 9 is interlockingly connected to a gear 13 formed in a basal end portion of the rocking lever 8. The reference numeral 15 denotes a top plate which extends between the guide plates 3a and 3b.

Referring to FIG. 14, 17 denotes movable tape guide posts which pull out a magnetic tape t from a tape cassette T to wind the tape around a head cylinder 18, 19 denotes a full-track erase head, 20 denotes an audio erase head, 21 denotes an audio control head, 22 denotes stationary tape guide posts, 23 denotes a back tension posts, 24 denotes a capstan, and 25 denotes a pinch roller.

In the above-mentioned configuration, under the state where the moving table 4 is on standby at the cassette inserting position A as indicated by the solid line in FIG. 16, the clutch of the gear mechanism 14 is disengaged. When the tape cassette T is inserted through a tape cassette insertion port 1a of the case 1 to the moving table 4, therefore, the moving table 4 is slightly moved backward (b). In response to a detection signal from a detector (not shown) which detects the backward motion b, the clutch of the gear mechanism 14 is set to the engaged state by the driving source via the worm gear 11, the worm gear 10, and the rotating cam 9, and the rotating cam 9 and the rocking levers 8 are integrally interlockingly connected to each other via the gear mechanism 14. Thereafter, when the rocking levers 8 are swung backward (d) by the driving source, the moving table 4 is horizontally moved backward (b) along the guide holes 6, and then vertically lowered to be placed at the cassette placing position B (see the phantom line in FIG. 16). The magnetic tape t is then pulled out from the tape cassette T (see the phantom line in FIG. 14), and subjected to a process such as replay.

When an eject button (not shown) is pressed, the rocking levers 8 are swung forward (c) in response to an eject signal by the driving source via the gear mechanism 14 and the like. As a result, the moving table 4 at the cassette placing position B is vertically lifted along the guide holes 6, and then moved horizontally forward (a) to the cassette inserting position A, so that the tape cassette T is ejected (see the solid line in FIG. 16).

The above-mentioned configuration has drawbacks that the clutch gear mechanism 14 through which the rotating cam 9 is interlockingly connected to the rocking levers 8 is complicated in structure and its production cost is high, and that backlash of the gear mechanism 14 causes the forward and backward motions a and b of the moving table 4 to become unstable.

SUMMARY OF THE INVENTION

In view of the drawbacks, it is an object of the invention to provide a magnetic tape device which is simple in structure, which can be economically produced, and in which a tape cassette moving table can be smoothly moved forward and backward.

In order to attain the object, according to a first aspect of the invention, in a magnetic tape device in which a tape cassette moving table is placed between a pair of right and left guide plates to be movable forward and backward, a rocking lever which is engaged with the moving table and a rotating member which is forward and reversely rotated by a driving source are interlockingly connected to each other via an interlocking mechanism, and the rocking lever is swung by the driving source via the rotating member and the interlocking mechanism to move the moving table forward and backward between a cassette inserting position and a cassette placing position, the interlocking mechanism has a slide plate configured by: a slide plate body which is placed to be slidable along one of the guide plates; and a bent piece which is bent into a substantially L-like shape from a lower edge of the slide plate body to elongate toward the rotating member, a rack which is engaged with a pinion formed on the rotating member is formed on the bent piece, an engaging hole which is to be engaged with an engaging pin protruding from the rocking lever is opened in the slide plate body, a lock lever which is engageable with the engaging pin is pivotally attached to the slide plate body, the rocking lever is backward swung to backward move the moving table toward the cassette placing position by backward sliding the slide plate to cause a peripheral portion of the engaging hole to be engaged with the engaging pin, and the rocking lever is forward swung to forward move the moving table toward the cassette inserting position by forward sliding the slide plate to cause the lock lever to be engaged with the engaging pin.

According to this configuration, the slide plate is used as an interlocking mechanism through which the rotating member is interlockingly connected to the rocking lever. The slide plate can be easily mass-produced simply by bending a steel plate into a substantially L-like shape to form the slide plate body and a bent piece, and forming a rack or the like on the bent piece. Therefore, the production cost is low. Since, unlike a gear mechanism which is conventionally used as an interlocking mechanism, backlash is not caused in the slide plate, the tape cassette moving table can be smoothly moved forward and backward via the rocking lever by sliding forward and backward the slide plate. By the simple structure in which the engaging hole which is opened in the slide plate body is engaged with the engaging pin protruding from the rocking lever, therefore, the moving table can be surely backward moved toward the cassette placing position via the rocking lever, with being interlocked with the backward sliding of the slide plate. Furthermore, by the simple structure in which the lock lever which is pivotally attached to the slide plate body is engaged with the engaging pin, the moving table can be surely forward moved toward the cassette inserting position via the rocking lever, with being interlocked with the forward sliding of the slide plate.

According to a second aspect of the invention, in a magnetic tape device in which a tape cassette moving table is placed between a pair of right and left guide plates to be movable forward and backward, a rocking lever which is engaged with the moving table and a rotating member which is forward and reversely rotated by a driving source are interlockingly connected to each other via an interlocking mechanism, and the rocking lever is swung by the driving source via the rotating member and the interlocking mechanism to move the moving table forward and backward between a cassette inserting position and a cassette placing position, the interlocking mechanism has a slide plate which is placed to be slidable along one of the guide plates, and which is to be engaged respectively with the rotating member and the rocking lever.

According to this configuration, the slide plate is used as an interlocking mechanism through which the rotating member is interlockingly connected to the rocking lever. The slide plate can be economically produced from a steel plate, and hence the production cost is low. Unlike a gear mechanism which is conventionally used as an interlocking mechanism, backlash is not caused in the slide plate. Therefore, the tape cassette moving table can be smoothly moved forward and backward by sliding forward and backward the slide plate.

According to a third aspect of the invention, in the second aspect of the invention, the slide plate is configured by: a slide plate body which is placed along the guide plate; and a bent piece which is bent into a substantially L-like shape from a lower edge of the slide plate body to elongate toward the rotating member, and a rack which is engaged with a pinion formed on the rotating member is formed on the bent piece.

According to this configuration, the slide plate can be economically mass-produced simply by bending a steel plate into a substantially L-like shape to form the slide plate body and the bent piece, and forming the rack on the bent piece.

According to a fourth aspect of the invention, in the third aspect of the invention, a slit which elongates along forward and backward directions is formed at a predetermined position in the slide plate body, a support piece which protrudes from the guide plate is passed through the slit, and a retaining portion which abuts against an outer side face of the slide plate body is disposed in a tip end portion of the support piece.

According to this configuration, the slide plate can be supported so as not to be vertically moved, by passing the support piece protruding from the guide plate through the slit of the slide plate body, and the slide plate can be supported so as not to be separated from the guide plate, by causing the retaining portion disposed in the tip end portion of the support piece to abut against the outer side face of the slide plate body.

According to a fifth aspect of the invention, in the third aspect of the invention, a recessed groove which is longitudinally formed in the bent piece is movably engaged with a lower edge portion of the guide plate.

According to this configuration, since the recessed groove which is longitudinally formed in the bent piece is movably engaged with a lower edge portion of the guide plate, the slide plate can be surely slid along the guide plate under the state where the slide plate is supported so as not to be accidentally moved in vertical and lateral directions.

According to a sixth aspect of the invention, in any one of the second to fifth aspects of the invention, an engaging hole which is to be engaged with an engaging pin protruding from the rocking lever is opened in the slide plate body, and the rocking lever is backward swung to backward move the moving table toward the cassette placing position by backward sliding the slide plate to cause a peripheral portion of the engaging hole to be engaged with the engaging pin.

According to this configuration, by the simple structure in which the engaging hole which is opened in the slide plate body is engaged with the engaging pin protruding from the rocking lever, the moving table can be surely backward moved toward the cassette placing position via the rocking lever, with being interlocked with the backward sliding of the slide plate.

According to a seventh aspect of the invention, in the sixth aspect of the invention, a lift-preventing portion which, when the moving table is placed at the cassette placing position, abuts against or approaches an upper edge of the engaging pin is formed in the peripheral portion of the engaging hole.

According to this configuration, when the moving table is placed at the cassette placing position, the lift-preventing portion which is formed in the peripheral portion of the engaging hole abuts against or approaches the upper edge of the engaging pin, thereby preventing the moving table from being lifted. Therefore, a magnetic tape can be smoothly loaded from a tape cassette which is set on the moving table, so that a clear image can be replayed.

According to an eighth aspect of the invention, in any one of the second to seventh aspects of the invention, a lock lever which is engageable with the engaging pin is pivotally attached to the slide plate body, a lock groove is formed in a tip end portion of the lock lever, and, under a state where the lock lever is swung and the lock groove is opposed to the engaging pin across a gap of a predetermined distance, the slide plate is forward slid to cause the lock groove to be engaged with the engaging pin, thereby forward swinging the rocking lever to forward move the moving table toward the cassette inserting position.

According to this configuration, under the state where the moving table is placed at the cassette placing position, when the slide plate is forward moved in response to an eject signal, also the lock lever is slid in the same direction, and, in the state before the sliding, the gap of a predetermined distance is formed between the lock groove and the engaging pin, so that a short time lag is produced before the lock groove is engaged with the engaging pin. Because of this time lag, it is possible to operate a door of a tape cassette insertion port opposed to the cassette inserting position so as to be opened in advance to the forward motion of the moving table. In accordance with the forward sliding of the slide plate, the lock groove is then engaged with the engaging pin, whereby the rocking lever is forward swung to forward move the moving table, so that a tape cassette which is set on the moving table can be ejected without colliding against the door.

According to a ninth aspect of the invention, in the eighth aspect of the invention, an engaging spring which urges the lock lever toward the engaging pin is disposed, and a lock canceling piece which, when the moving table is forward moved to the cassette inserting position, is engaged with the lock lever against the engaging spring to separate the lock lever from the engaging pin protrudes from the one guide plate.

According to this configuration, when the moving table is forward moved to the cassette inserting position, the lock lever is engaged with the lock canceling piece, whereby the lock lever is separated from the engaging pin against the engaging spring to cancel the lock. When a tape cassette is to be inserted to the moving table which is on standby at the cassette inserting position, therefore, the moving table is allowed to be backward moved, and the backward motion can be surely detected by a detector. Although the lock lever corresponds in function to the clutch in the conventional art, the lock lever is simpler in structure than the clutch, and can be economically produced.

It is important to emphasize that the combination of the lock lever, the engaging pin, the engaging spring, and the lock canceling piece produces both the functions, or the time lag producing function (the eighth aspect of the invention) and the clutch function (the ninth aspect of the invention). This enables the operations of injecting and ejecting a tape cassette to be smoothly performed.

According to a tenth aspect of the invention, in any one of the first to ninth aspects of the invention, a tip end of a door open lever which is pivotally attached to the one guide plate is engaged with a door of a tape cassette insertion port opposed to the cassette inserting position, an opening pin protrudes from the slide plate to be opposed to the door open lever, and the opening pin is engaged with the door open lever to open the door by forward and backward sliding the slide.

According to this configuration, of course, when, in response to an eject signal, the slide plate is forward slid to forward move the moving table at the cassette placing position, the opening pin protruding from the slide plate is engaged with the door open lever so that the door can be opened. Moreover, even in the case where a trouble occurs and the door cannot be opened, the opening pin can be engaged with the door open lever by backward sliding the slide plate, so that the door can be compulsively opened.

DETAILED DESCRIPTION OF THE PREFERRED EMBODIMENTS

Now, a description will be given in more detail of preferred embodiments of the invention with reference to the accompanying drawings.

Figure 14:
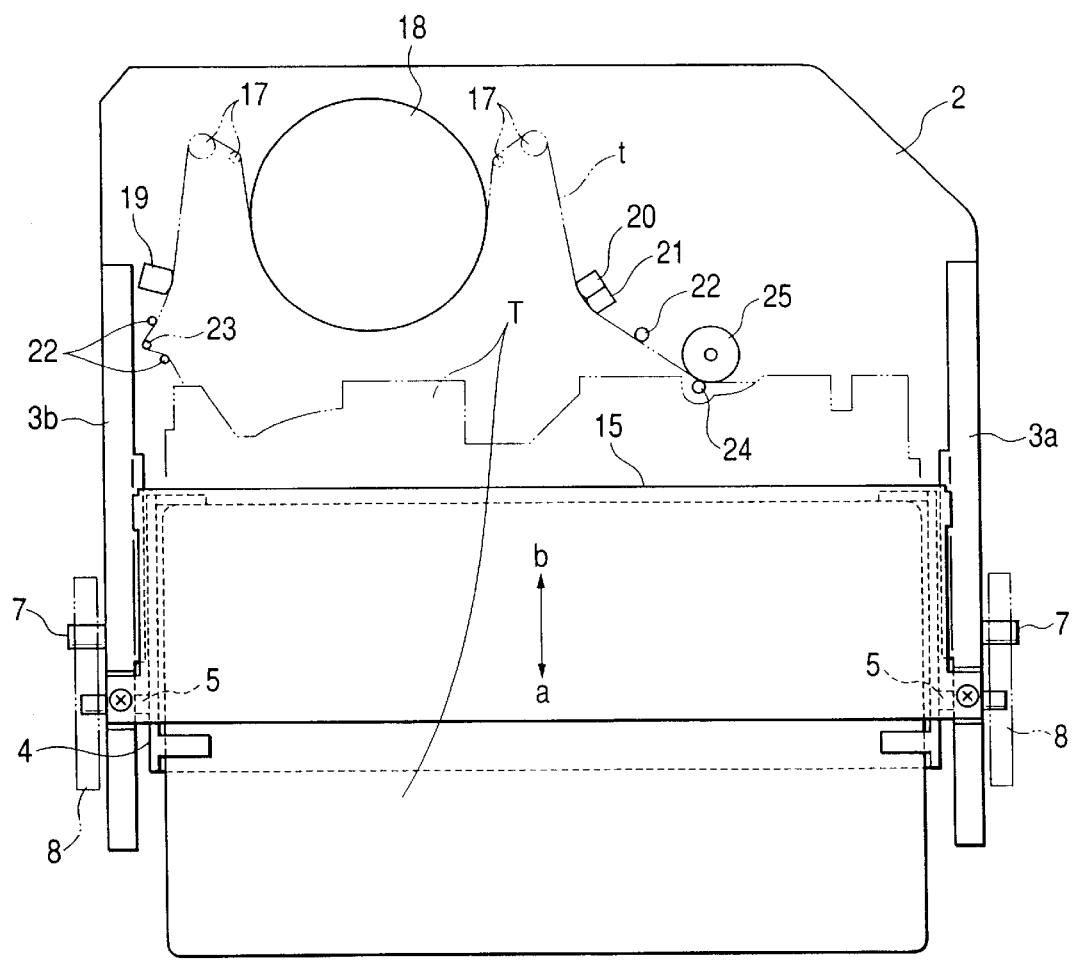
FIG. 14 is a diagrammatic plan view showing a conventional art example.
Figure 15:
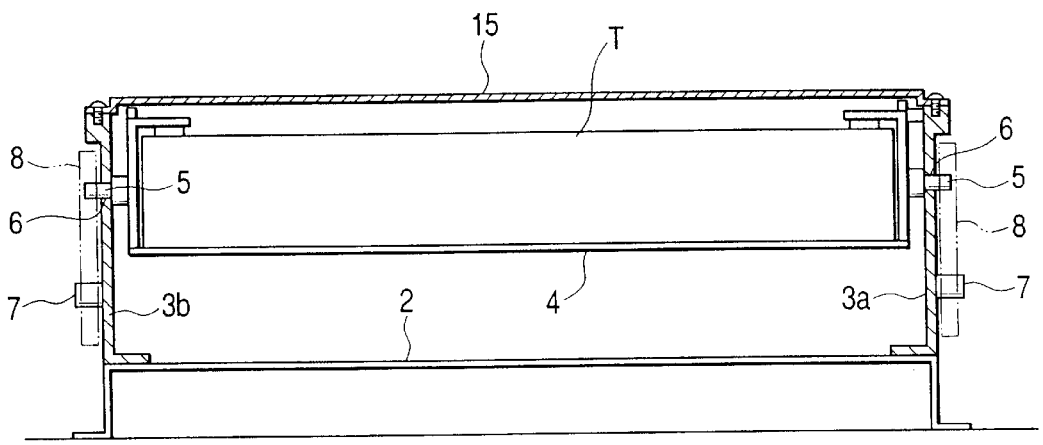
FIG. 15 is a partially cutaway front view of the example.
Figure 16:
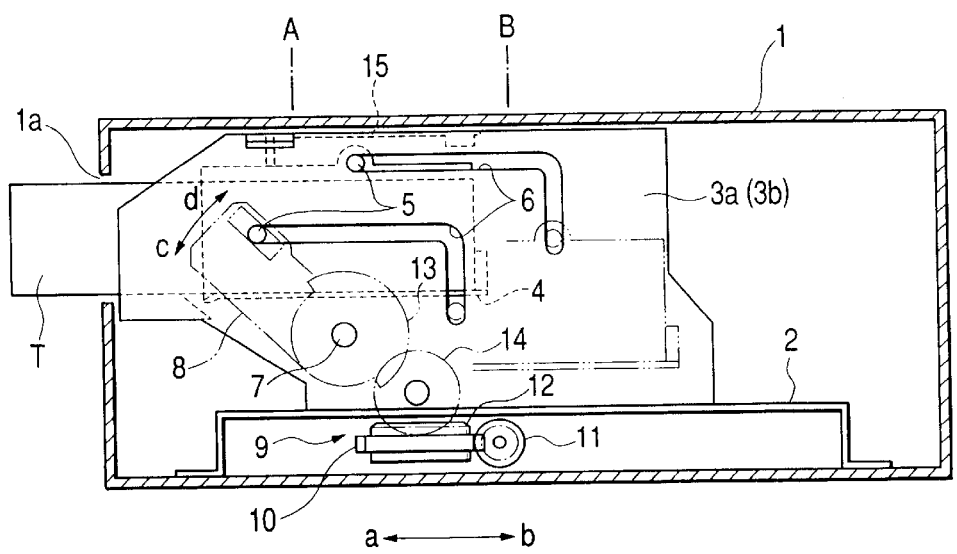
FIG. 16 is a partially cutaway side view of the example.

FIGS. 1 to 6 show a magnetic tape device which is an embodiment of the invention. A pair of right and left guide plates 3a and 3b are formed integrally with a chassis 2 by bending a steel plate into a substantially U-like shape. A slide plate 26 is used as an interlocking mechanism through which rocking levers 8 for moving forward and backward (a and b) a moving table 4 placed between the guide plates 3a and 3b are interlockingly connected to a rotating cam (rotating member) 9. With respect to the configuration other than that described above, components identical with those of the configuration shown in FIGS. 14 to 16 are denoted by the same reference numerals, and their description is omitted.

Figure 6:
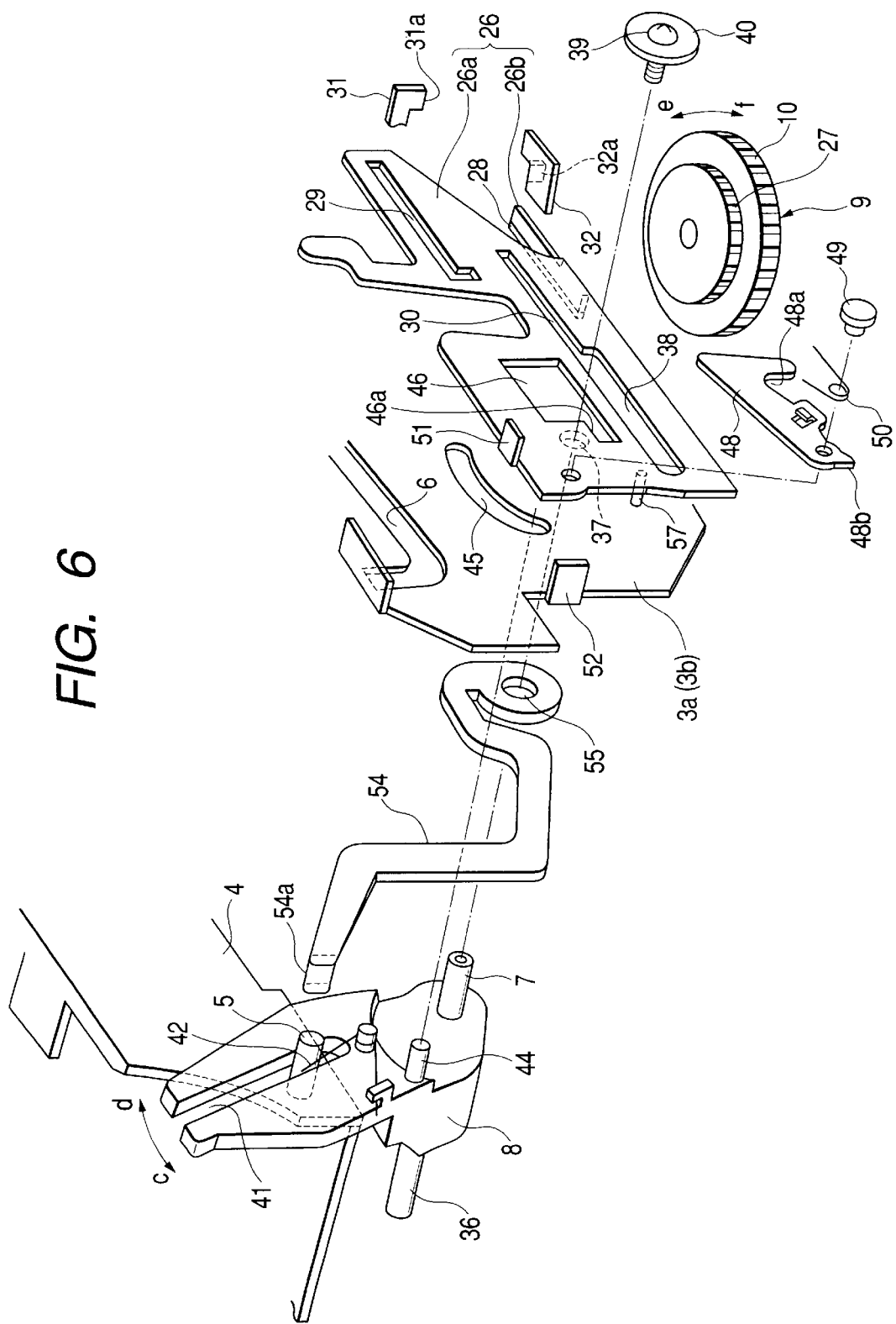
FIG. 6 is an exploded perspective view of main portions of the embodiment.
Figure 7:
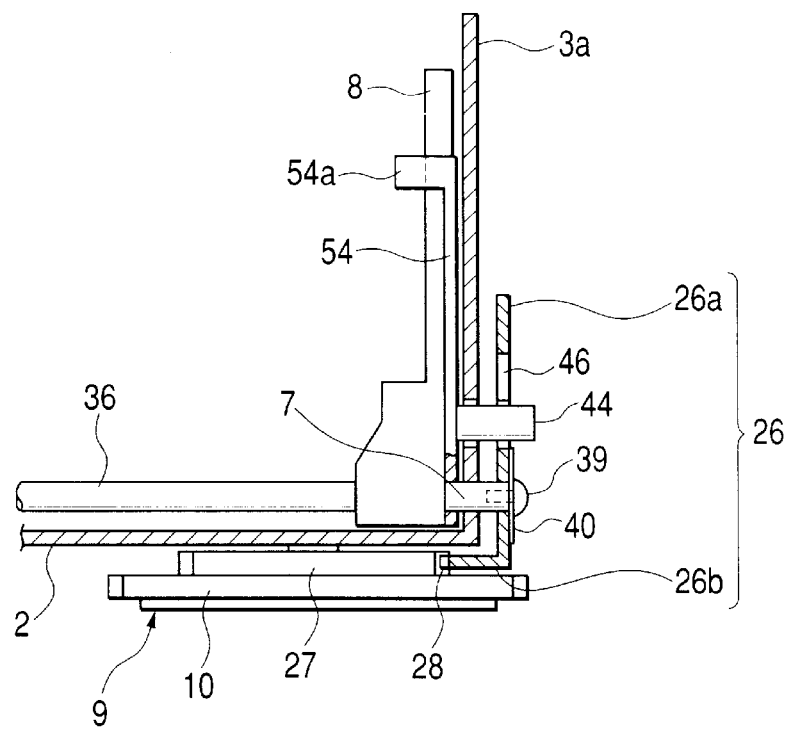
FIG. 7 is a cross section view of main portions in the vicinity of a rocking lever.
Figure 8:
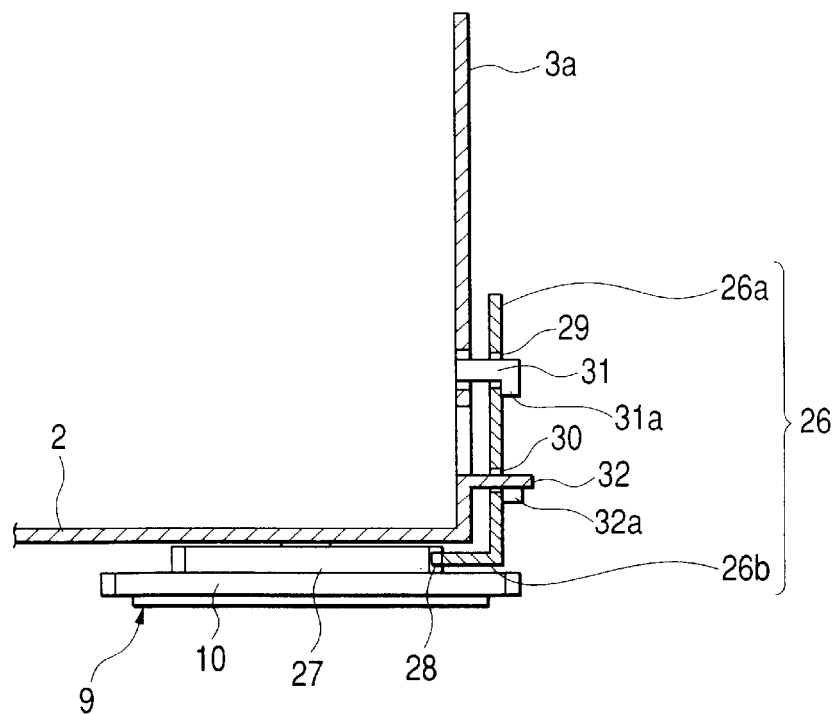
FIG. 8 is a cross section view of main portions in the vicinity of a slide plate.

As shown in FIGS. 6 to 8, the slide plate 26 consists of: the slide plate body 26a which is placed so as to be slidable along the right guide plate 3a; and a bent piece 26b which is bent into a substantially L-like shape from the lower edge of the slide plate body 26a to elongate toward the rotating cam 9. A rack 28 which is to be engaged with a pinion 27 of the rotating cam 9 is formed on the bent piece 26b. The slide plate 26 can be economically mass-produced from a steel plate.

As shown in FIGS. 6 and 8, a pair of upper and lower slits 29 and 30 are formed in the slide plate body 26a along the forward and backward motion directions a and b. Support pieces 31 and 32 which protrude from the right guide plate 3a are passed through the slits 29 and 30, respectively. Retaining portions 31a and 32a which are formed by bending tip end portions of the support pieces 31 and 32 abut against the outer side face of the slide plate body 26a. According to this configuration, the slide plate 26 can be supported so as not to be vertically moved, and supported so as not to be separated from the right guide plate 3a.

Figure 9:
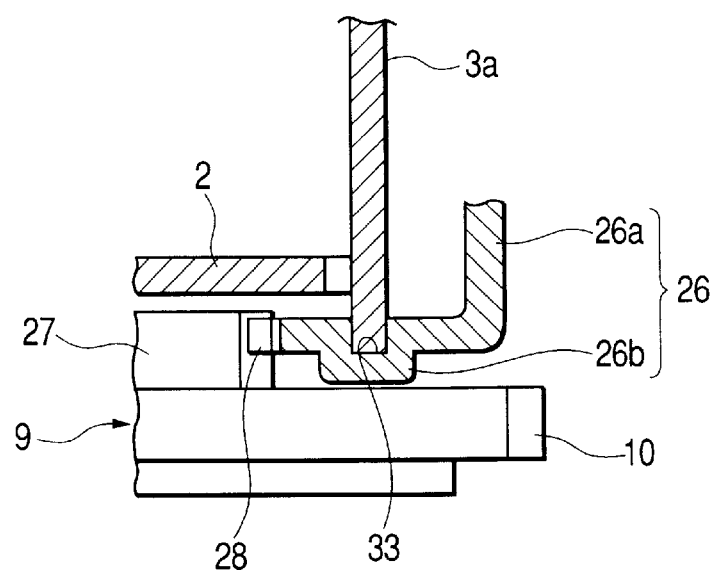
FIG. 9 is an enlarged cross section view of main portions and showing a modification of the vicinity of the slide plate.

In place of the support pieces 31 and 32, as shown in FIG. 9, a recessed groove 33 which is longitudinally formed in the bent piece 26b may be formed so as to be movably engaged with a lower edge portion of the right guide plate 3a. According to this configuration, the slide plate 26 can be surely slid along the right guide plate 3a under the state where the slide plate is supported so as not to be accidentally moved in vertical and lateral directions.

Figure 1:
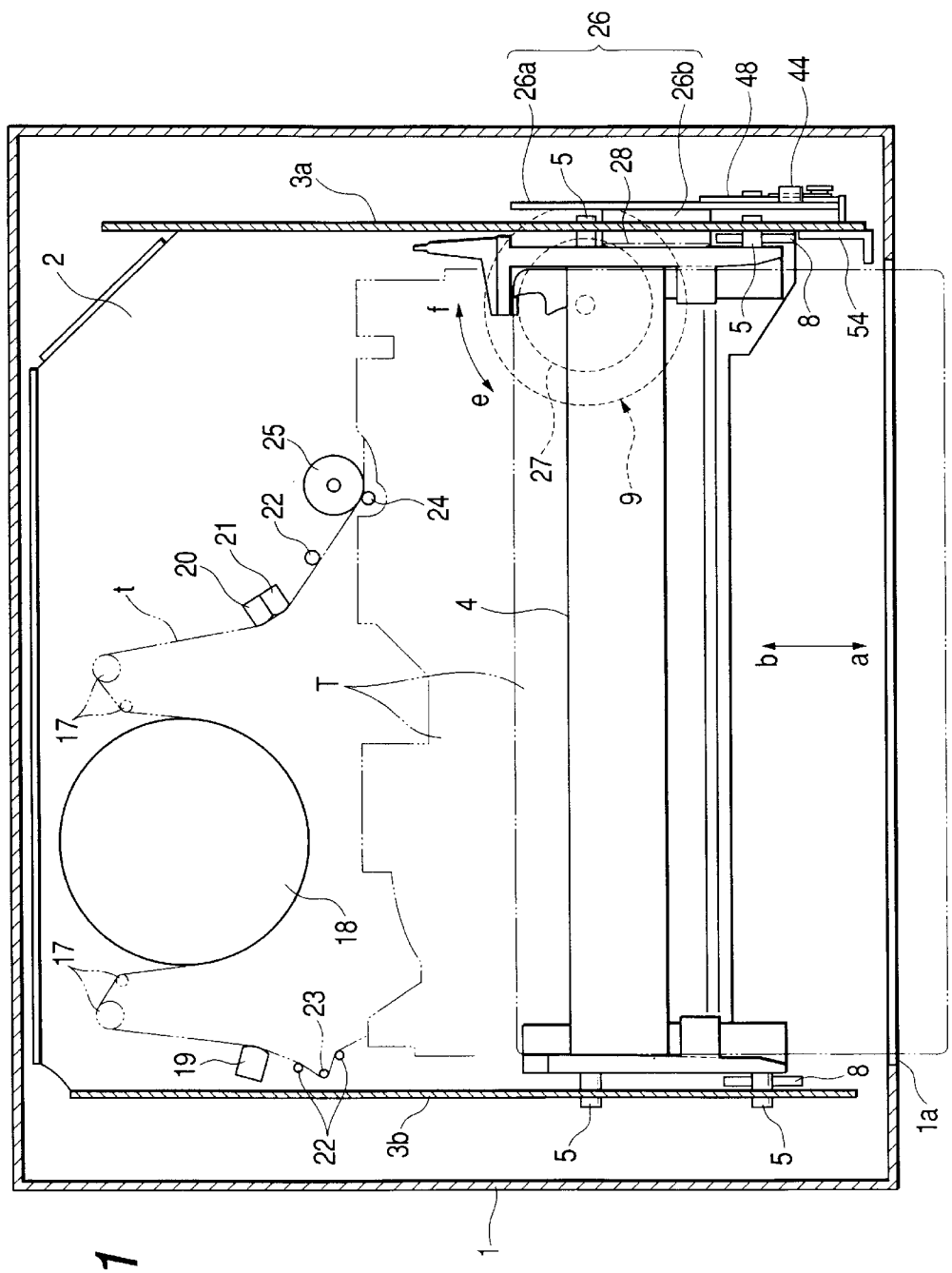
FIG. 1 is a diagrammatic plan view of a magnetic tape device which is an embodiment of the invention.
Figure 2:
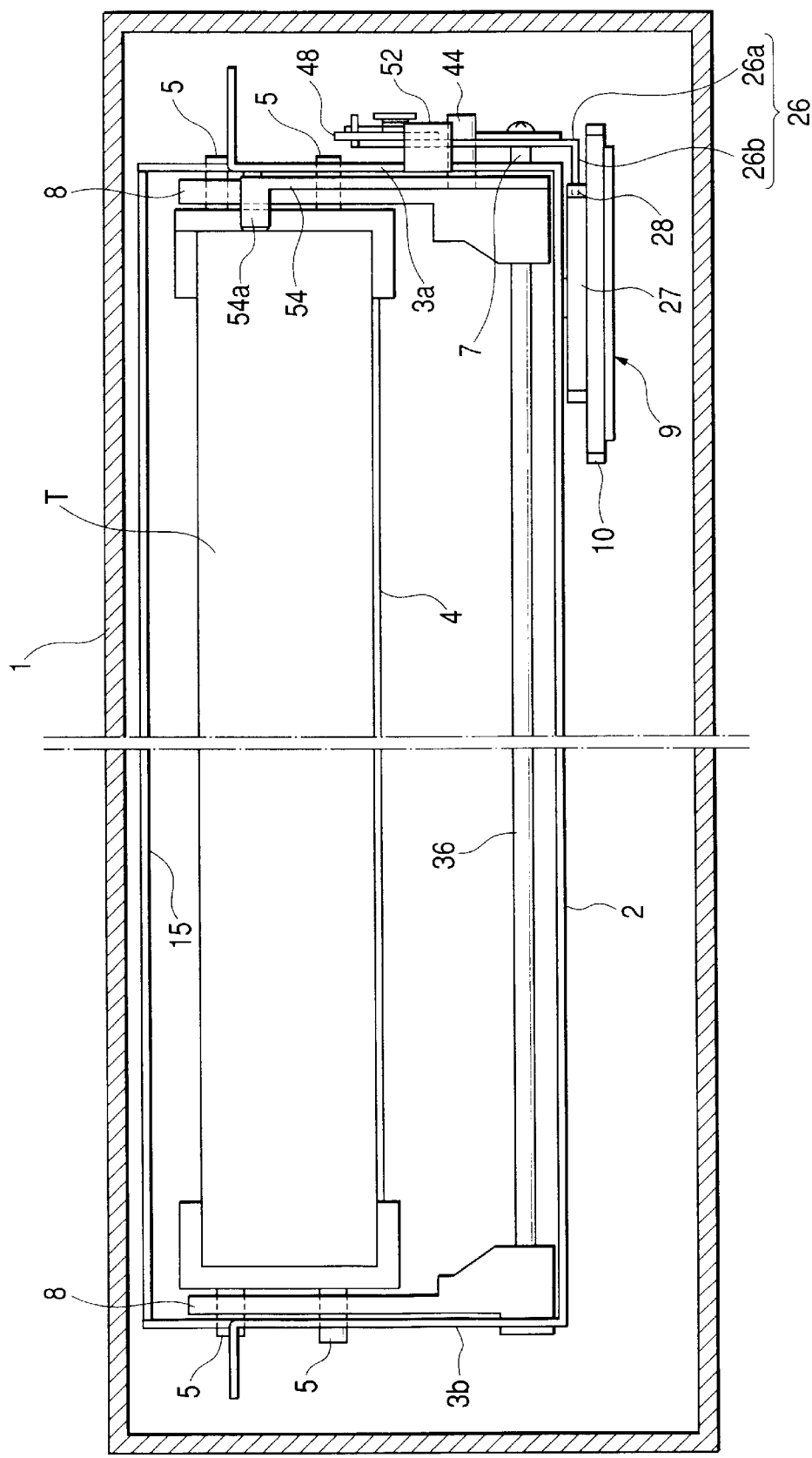
FIG. 2 is an enlarged partially cutaway front view of the embodiment.

As shown in FIGS. 2 and 6, the rocking levers 8 are respectively disposed inside the guide plates 3a and 3b so as to constitute paired right and left rocking levers, and integrally connected to each other through a connecting shaft 36. Pivot shafts 7 which protrude from the outer side faces of the rocking levers 8 so as to be coaxial with the connecting shaft 36 are rotatably passed through holes 37 of the chassis 2, respectively, whereby the rocking levers 8 are enabled to be swung forward and backward (c and d) about the pivot shafts 7. The pivot shaft 7 of the right rocking lever 8 is passed through an oblong hole 38 which is formed in the slide plate body 26a along the forward and backward motion directions a and b. A retaining washer 40 which is fixedly attached to an end face of the pivot shaft 7 by a screw 39 abuts against an outer side face of the slide plate body 26a. U-like grooves 41 which are respectively formed in the rocking levers 8 so as to elongate from the tip end to the basal end are fitted onto front guide rods 5 which protrude from both the side faces of the moving table 4, respectively. Press springs 42 which are engaged with the front guide rods 5 are disposed on the rocking levers 8, respectively.

Figure 3:
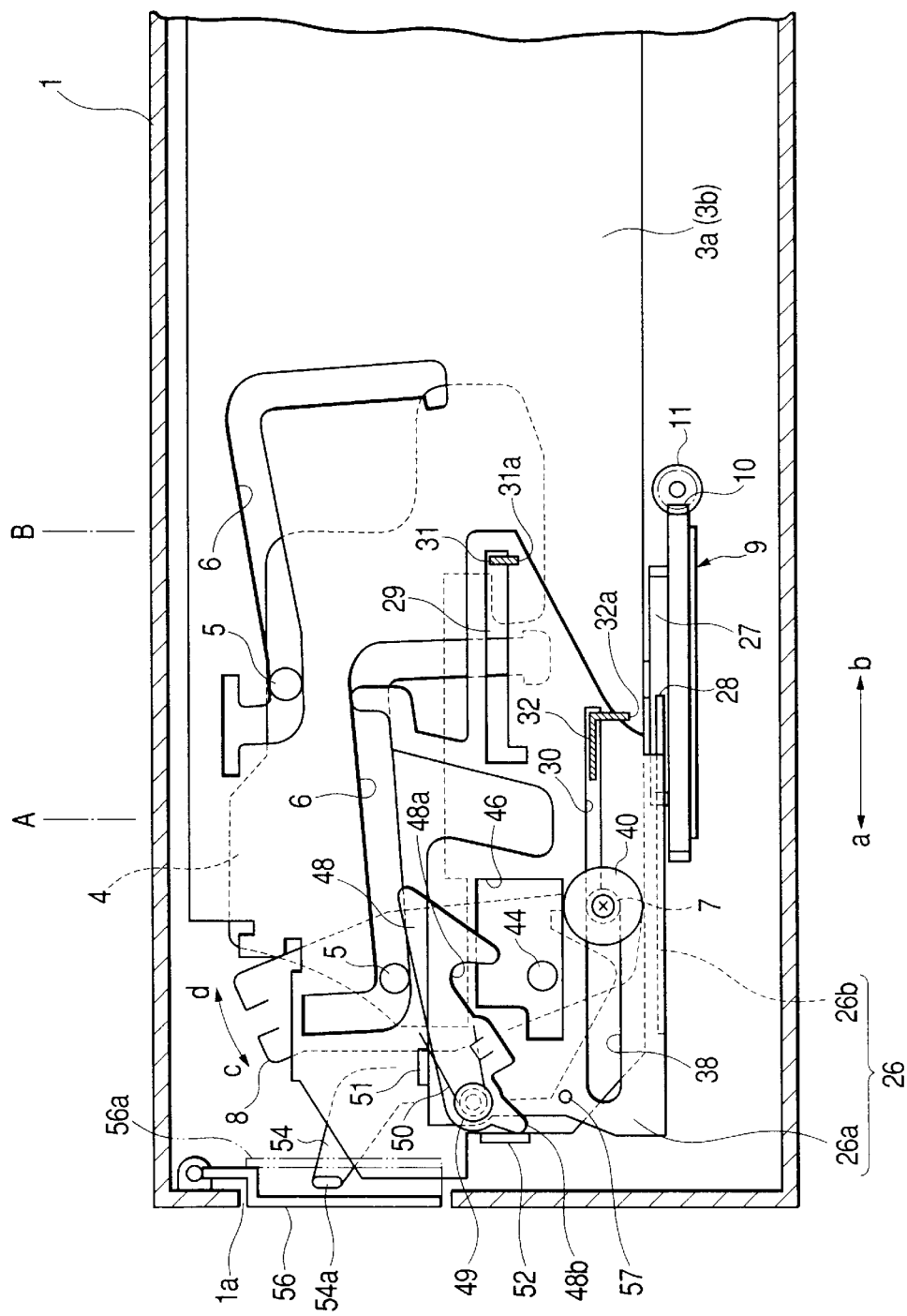
FIG. 3 is an enlarged partially cutaway side view of the embodiment in the state where a moving table is forward moved.

As shown in FIGS. 3 and 6, an engaging pin 44 which protrudes from the right rocking lever 8 is passed through an engaging hole 46 opened in the slide plate body 26a, with passing through a hole 45 of the right guide plate 3a. As shown in FIG. 3, under the state where the moving table 4 is on standby at the cassette inserting position A, the slide plate 26 is backward slid so that the engaging pin 44 is pressed by a peripheral portion of the engaging hole 46, whereby the rocking lever 8 is swung backward (d) so that the moving table 4 can be moved backward (b) toward the cassette placing position B. In this configuration, it is requested only to engage the engaging hole 46 with the engaging pin 44. Therefore, the configuration is simple, and the production cost can be lowered.

As shown in FIGS. 3 and 6, an arcuate lock groove 48a which is engageable with the engaging pin 44 is formed in a tip end portion of a lock lever 48, and the basal end portion of the lock lever 48 is pivotally attached via a pivot shaft 49 to a front upper portion of the slide plate body 26a. One end of an engaging spring 50 which is wound around the pivot shaft 49 is engaged with the lock lever 48, and the other end of the engaging spring 50 is engaged with an engaging piece 51 which is bent from the upper end of the slide plate 26, thereby urging the lock lever 48 toward the engaging pin 44. A protruding portion 48b protrudes from a basal end portion of the lock lever 48 so as to be opposed to a lock canceling piece 52 which is bent from the front end of the right guide plate 3a.

Figure 4:
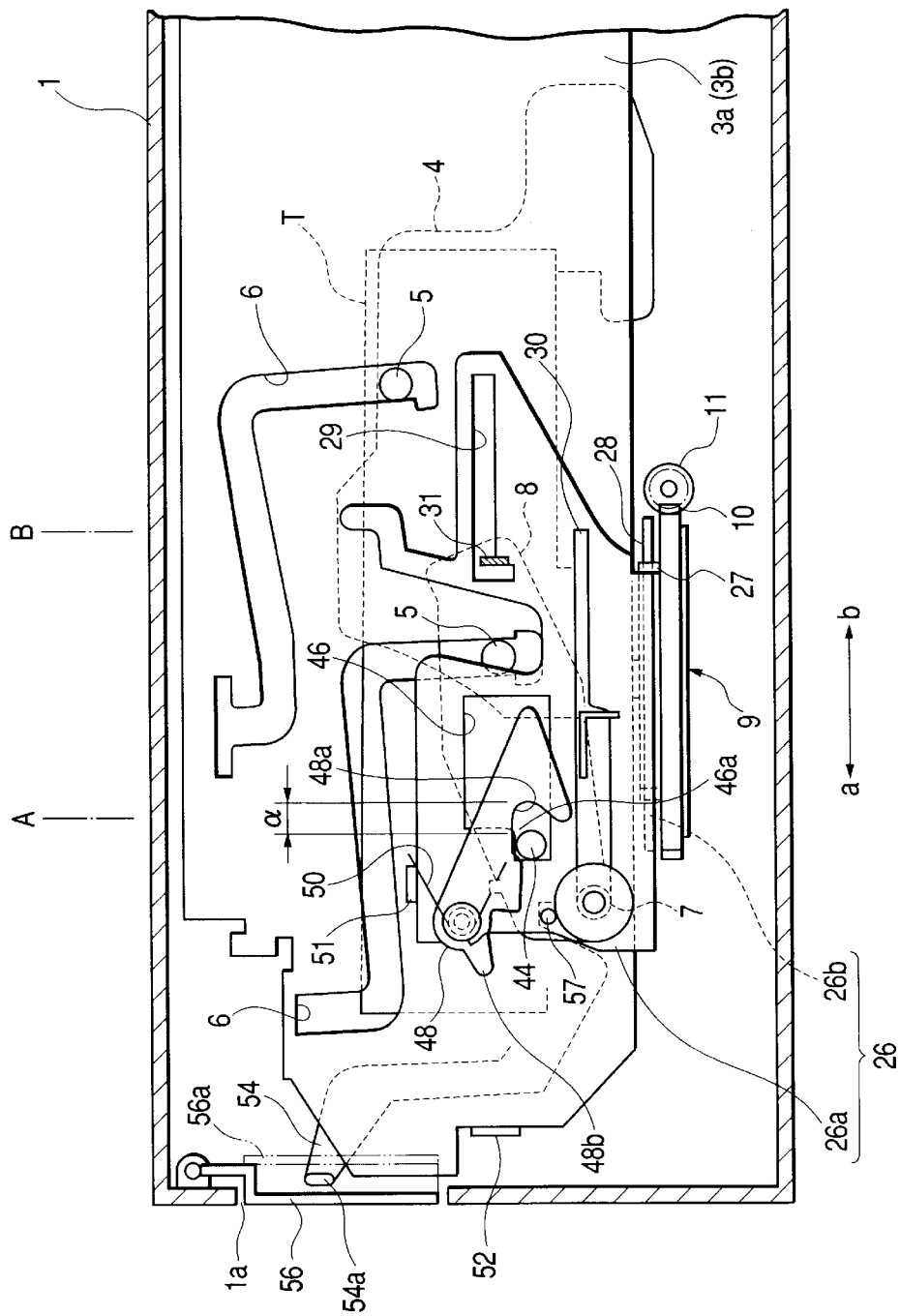
FIG. 4 is an enlarged partially cutaway side view of the embodiment in the state where the moving table is backward moved.
Figure 5:
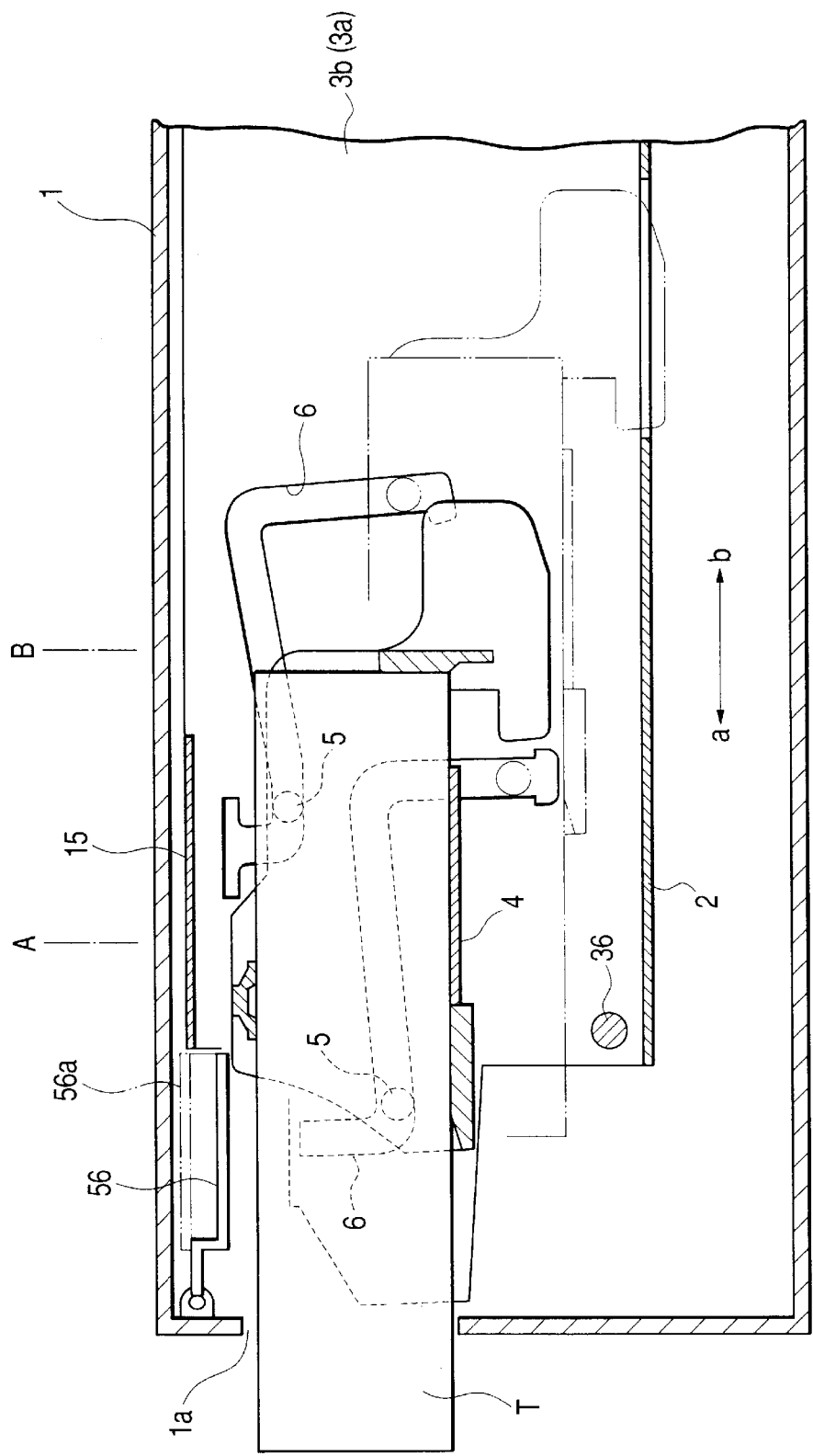
FIG. 5 is an enlarged longitudinal section view of the embodiment in the case where a tape cassette is inserted.

In the configuration, as shown in FIG. 4, under the state where the moving table 4 is placed at the cassette placing position B, when the slide plate 26 is forward slid in response to an eject signal, also the lock lever 48 is slid in the same direction, and, in the state before the sliding, a gap α the width of which is approximately equal to the diameter of the engaging pin 44 is formed between the lock groove 48a and the engaging pin 44, so that a short time lag is produced before the lock groove 48a is engaged with the engaging pin 44. Because of this time lag, it is possible to operate a door 56 of the tape cassette insertion port 1a so as to be opened in advance to the forward motion a of the moving table 4. In accordance with the forward sliding of the slide plate 26, the lock groove 48a is then engaged with the engaging pin 44 (see FIG. 12), whereby the rocking lever 8 is swung forward (c) to move forward (a) the moving table 4, so that a tape cassette T which is set on the moving table 4 can be ejected without colliding against the door 56.

When the moving table 4 is moved forward (a) to the cassette inserting position A (see FIG. 3), the protruding portion 48b of the lock lever 48 is engaged with the lock canceling piece 52, whereby the lock lever 48 is separated from the engaging pin 44 against the engaging spring 50 to cancel the lock. When, during the injecting operation, the tape cassette T is inserted to the moving table 4 which is on standby at the cassette inserting position A (see FIG. 5), therefore, the moving table 4 is allowed to be moved backward (b), and the backward motion b can be surely detected by a detector. Although the lock lever 48 corresponds in function to the clutch in the conventional art, the lock lever is simpler in structure than the clutch, and can be economically produced.

It is important to emphasize that the combination of the lock lever 48, the engaging pin 44, the engaging spring 50, and the lock canceling piece 52 produces both the functions, or the time lag producing function and the clutch function. This enables the operations of injecting and ejecting the tape cassette T to be smoothly performed.

Figure 10:
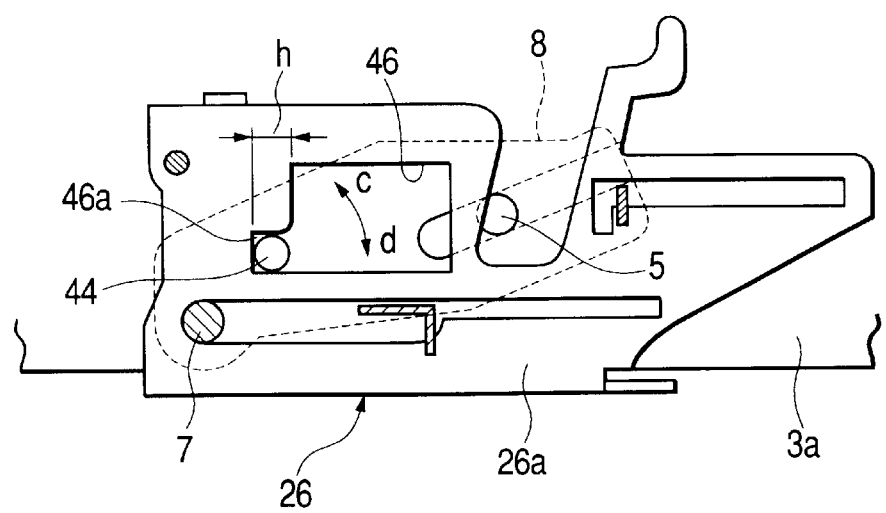
FIG. 10 is a side view of main portions and showing the state where the moving table is prevented from being lifted.

As shown in FIG. 10, a lift-preventing portion 46a which, when the moving table 4 is placed at the cassette placing position B, abuts against or approaches the upper edge of the engaging pin 44 is formed in the peripheral portion of the engaging hole 46. The width h of the lift-preventing portion 46a is set to be approximately equal to the diameter of the engaging pin 44. According to this configuration, a magnetic tape t can be smoothly loaded from the tape cassette T which is set on the moving table 4, so that a clear image can be replayed.

Figure 11:
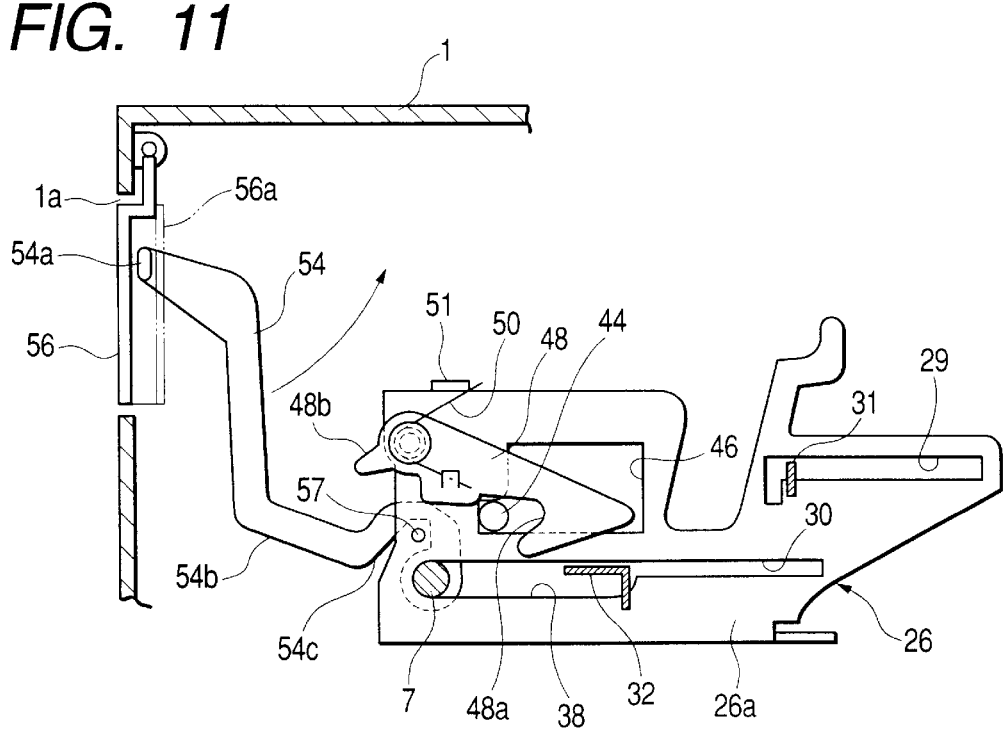
FIG. 11 is a side view of main portions and showing the closed condition of a door in the state where the moving table is backward moved.

As shown in FIGS. 6 and 11, a hole 55 which is opened in a basal end portion of a door open lever 54 is rotatably fitted onto the pivot shaft 7 of the right rocking lever 8, a tip end portion 54a of the door open lever 54 is engaged with a side edge portion 56a of the door 56, and substantially V-like inclined faces 54b and 54c are formed in a lower portion of the door open lever 54. An opening pin 57 protrudes from a front edge portion of the slide plate body 26a so as to be opposed to the inclined faces 54b and 54c.

Figure 12:
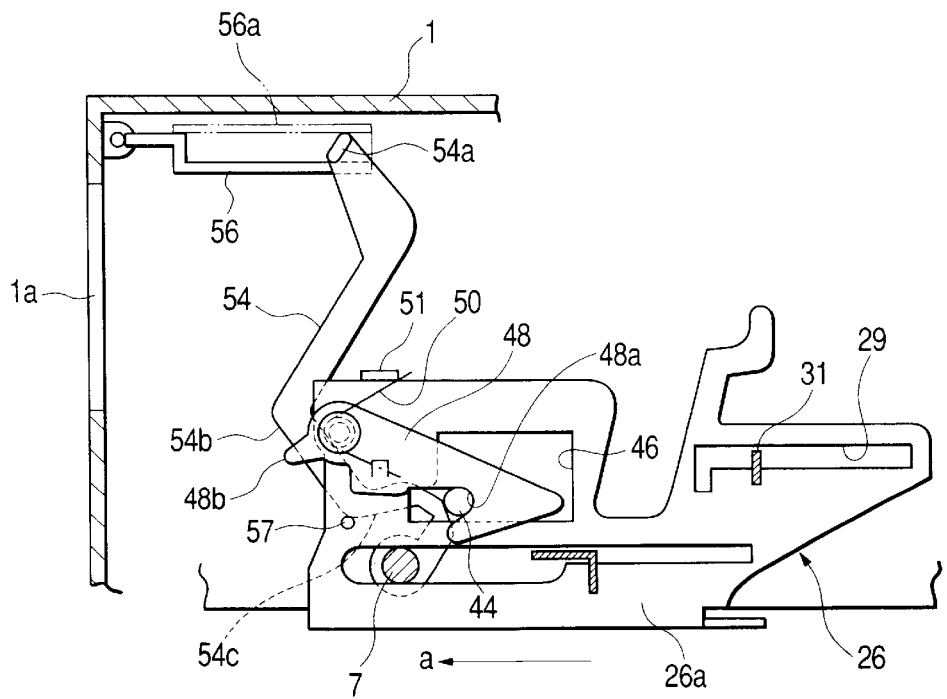
FIG. 12 is a side view of main portions and showing the opened condition of the door when the moving table is forward moved.

In this configuration, as shown in FIG. 11, when the slide plate 26 is forward slid under the state where the moving table 4 is placed at the cassette placing position B, the opening pin 57 is pressed against the rear inclined face 54c of the door open lever 54 to upward swing the door open lever 54, so that the door 56 can be opened (see FIG. 12). Therefore, the tape cassette T set on the moving table 4 which is moved forward (a) from the cassette placing position B does not collide against the door 56.

Figure 13:
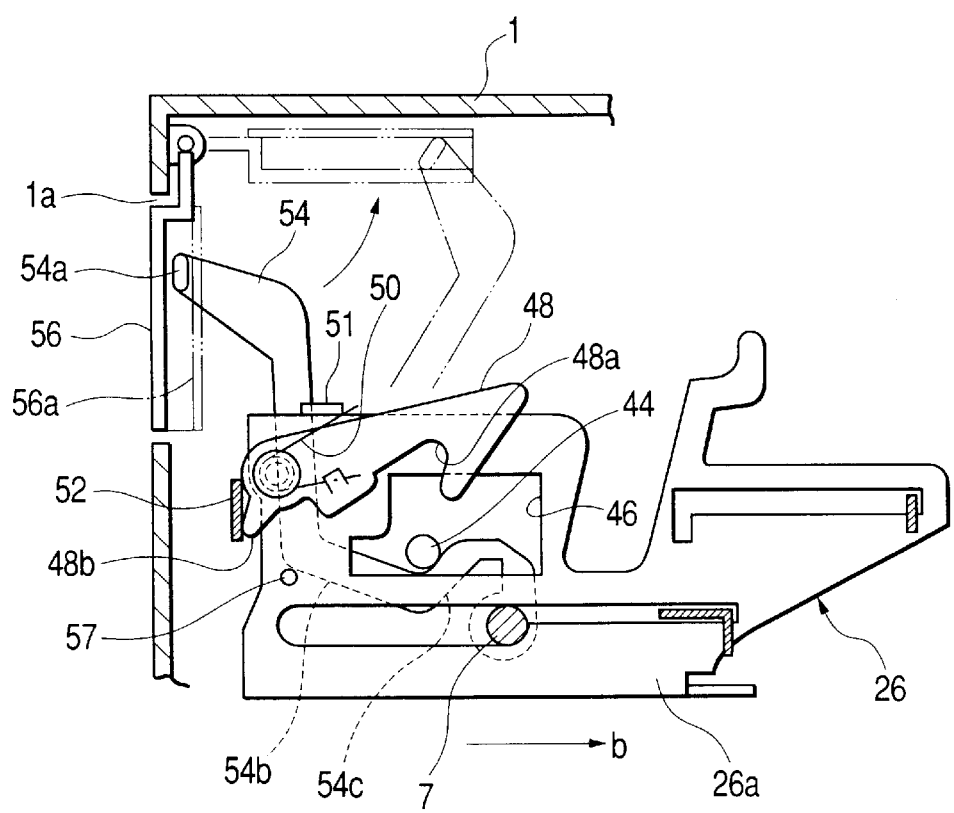
FIG. 13 is a side view of main portions and showing the opened condition of the door in the state where the moving table is forward moved.

As shown in FIG. 13, even in the case where a trouble occurs and the door 56 cannot be opened under the state where the moving table 4 is on standby at the cassette inserting position A, when the slide plate 26 is backward slid by a manual operation or the like, the opening pin 57 is pressed against the front inclined face 54b of the door open lever 54 to upward swing the door open lever 54, whereby the door 56 can be compulsively opened (see the phantom line in FIG. 13).

The function of the above configuration will be described. As shown in FIG. 3, the door 56 is pushed up by the tape cassette T under the state where the moving table 4 is on standby at the cassette inserting position A, so that the tape cassette T is inserted to the moving table 4 through the tape cassette insertion port 1a (see FIG. 5). In this case, since the lock lever 48 is separated from the engaging pin 44, the moving table 4 is slightly moved backward (b). In response to a detection signal from a detector (not shown) which detects the backward motion b, the rotating cam 9 is rotated forward (e) by the driving source via the worm gear 11 and the worm gear 10, and the slide plate 26 is backward slid via the pinion 27 of the rotating cam 9 and the rack 28. This causes the peripheral portion of the engaging hole 46 to press the engaging pin 44, whereby the rocking levers 8 are swung backward (d), so that the moving table 4 is horizontally moved backward (b) along the guide holes 6, and then vertically lowered to be placed at the cassette placing position B (see FIG. 4). The magnetic tape t is then pulled out from the tape cassette T (see FIG. 1), and subjected to a process such as replay.

As a result of the backward sliding of the slide plate 26, the protruding portion 48b of the lock lever 48 is separated from the lock canceling piece 52, and the lock lever 48 is downward swung by the engaging spring 50 to abut against the engaging pin 44. At this time, the gap α the width of which is approximately equal to the diameter of the engaging pin 44 is formed between the engaging pin 44 and the lock groove 48a (see FIG. 4).

The lift-preventing portion 46a which is formed in the peripheral portion of the engaging hole 46 abuts against or approaches the upper edge of the engaging pin 44 (see FIG. 10). According to this configuration, the moving table 4 which is placed at the cassette placing position B is prevented from being lifted, so that the magnetic tape t can be smoothly loaded from the tape cassette T which is set on the moving table 4 and a clear image can be replayed.

When an eject button (not shown) is thereafter pressed, the rotating cam 9 is rotated reversely (f) by the driving source in response to an eject signal, whereby the slide plate 26 is forward slid via the pinion 27 of the rotating cam 9 and the rack 28. This causes the opening pin 57 to be pressed against the rear inclined face 54c of the door open lever 54 to upward swing the door open lever 54, so that the door 56 is opened (see FIG. 12). Thereafter, the lock groove 48a of the lock lever 48 is engaged with the engaging pin 44 (see FIG. 12), the rocking levers 8 are swung forward (c), so that the moving table 4 is vertically lifted along the guide holes 6 and then moved horizontally forward (a) to the cassette inserting position A, and the tape cassette T is ejected (see FIG. 5).

According to the first aspect of the invention, the slide plate is used as an interlocking mechanism through which the rotating member is interlockingly connected to the rocking lever. The slide plate can be easily mass-produced simply by bending a steel plate into a substantially L-like shape to form the slide plate body and a bent piece, and forming a rack or the like on the bent piece. Therefore, the production cost is low. Since, unlike a gear mechanism which is conventionally used as an interlocking mechanism, backlash is not caused in the slide plate, the tape cassette moving table can be smoothly moved forward and backward via the rocking lever by sliding forward and backward the slide plate. By the simple structure in which the engaging hole which is opened in the slide plate body is engaged with the engaging pin protruding from the rocking lever, therefore, the moving table can be surely backward moved toward the cassette placing position via the rocking lever, with being interlocked with the backward sliding of the slide plate. Furthermore, by the simple structure in which the lock lever which is pivotally attached to the slide plate body is engaged with the engaging pin, the moving table can be surely forward moved toward the cassette inserting position via the rocking lever, with being interlocked with the forward sliding of the slide plate.

According to the second aspect of the invention, the slide plate is used as an interlocking mechanism through which the rotating member is interlockingly connected to the rocking lever. The slide plate can be economically produced from a steel plate, and hence the production cost is low. Unlike a gear mechanism which is conventionally used as an interlocking mechanism, backlash is not caused in the slide plate. Therefore, the tape cassette moving table can be smoothly moved forward and backward by sliding forward and backward the slide plate.

According to the third aspect of the invention, the slide plate can be economically mass-produced simply by bending a steel plate into a substantially L-like shape to form the slide plate body and the bent piece, and forming the rack on the bent piece.

According to the fourth aspect of the invention, the slide plate can be supported so as not to be vertically moved, by passing the support piece protruding from the guide plate through the slit of the slide plate body, and the slide plate can be supported so as not to be separated from the guide plate, by causing the retaining portion disposed in the tip end portion of the support piece to abut against the outer side face of the slide plate body.

According to the fifth aspect of the invention, since the recessed groove which is longitudinally formed in the bent piece is movably engaged with a lower edge portion of the guide plate, the slide plate can be surely slid along the guide plate under the state where the slide plate is supported so as not to be accidentally moved in vertical and lateral directions.

According to the sixth aspect of the invention, by the simple structure in which the engaging hole which is opened in the slide plate body is engaged with the engaging pin protruding from the rocking lever, the moving table can be surely backward moved toward the cassette placing position via the rocking lever, with being interlocked with the backward sliding of the slide plate.

According to the seventh aspect of the invention, when the moving table is placed at the cassette placing position, the lift-preventing portion which is formed in the peripheral portion of the engaging hole abuts against or approaches the upper edge of the engaging pin, thereby preventing the moving table from being lifted. Therefore, a magnetic tape can be smoothly loaded from a tape cassette which is set on the moving table, so that a clear image can be replayed.

According to the eighth aspect of the invention, under the state where the moving table is placed at the cassette placing position, when the slide plate is forward moved in response to an eject signal, also the lock lever is slid in the same direction, and, in the state before the sliding, the gap of a predetermined distance is formed between the lock groove and the engaging pin, so that a short time lag is produced before the lock groove is engaged with the engaging pin. Because of this time lag, it is possible to operate a door of a tape cassette insertion port opposed to the cassette inserting position so as to be opened in advance to the forward motion of the moving table. In accordance with the forward sliding of the slide plate, the lock groove is then engaged with the engaging pin, whereby the rocking lever is forward swung to forward move the moving table, so that a tape cassette which is set on the moving table can be ejected without colliding against the door.

According to the ninth aspect of the invention, when the moving table is forward moved to the cassette inserting position, the lock lever is engaged with the lock canceling piece, whereby the lock lever is separated from the engaging pin against the engaging spring to cancel the lock. When a tape cassette is to be inserted to the moving table which is on standby at the cassette inserting position, therefore, the moving table is allowed to be backward moved, and the backward motion can be surely detected by a detector.

Although the lock lever corresponds in function to the clutch in the conventional art, the lock lever is simpler in structure than the clutch, and can be economically produced.

It is important to emphasize that the combination of the lock lever, the engaging pin, the engaging spring, and the lock canceling piece produces both the functions, or the time lag producing function (the eighth aspect of the invention) and the clutch function (the ninth aspect of the invention). This enables the operations of injecting and ejecting a tape cassette to be smoothly performed.

According to the tenth aspect of the invention, of course, when, in response to an eject signal, the slide plate is forward slid to forward move the moving table at the cassette placing position, the opening pin protruding from the slide plate is engaged with the door open lever so that the door can be opened. Moreover, even in the case where a trouble occurs and the door cannot be opened, the opening pin can be engaged with the door open lever by backward sliding the slide plate, so that the door can be compulsively opened.

What is claimed is:

1. A magnetic tape device comprising:

a pair of right and left guide plates;

a tape cassette moving table placed between said pair of right and left guide plates to be movable forward and backward;

a rocking lever engaged with said moving table;

a driving member;

a rotating member which is forward and reversely rotated by said driving member; and an interlocking mechanism by which said driving member and said rotating member are interlockingly connected to each other;

wherein said rocking lever is swung by said driving member via said rotating member and said interlocking mechanism to move said moving table forward and backward between a cassette inserting position and a cassette placing position;

wherein said interlocking mechanism includes a slide plate that has a slide plate body which is placed to be slidable along one of said guide plates and a bent piece which is bent into a substantially L-like shape from a lower edge of said slide plate body to elongate toward said rotating member; and wherein a rack which is engaged with a pinion formed on said rotating member is formed on said bent piece, an engaging hole which is to be engaged with an engaging pin protruding from said rocking lever is opened in said slide plate body, a lock lever which is engageable with said engaging pin is pivotally attached to said slide plate body, said rocking lever is backward swung to backward move said moving table toward the cassette placing position by backward sliding said slide plate to cause a peripheral portion of said engaging hole to be engaged with said engaging pin, and said rocking lever is forward swung to forward move said moving table toward the cassette inserting position by forward sliding said slide plate to cause said lock lever to be engaged with said engaging pin.

2. A magnetic tape device according to claim 1, wherein a tip end of a door open lever which is pivotally attached to said one guide plate is engaged with a door of a tape cassette insertion port opposed to the cassette inserting position, an opening pin protrudes from said slide plate to be opposed to said door open lever, and said opening pin is engaged with said door open lever to open said door by forward and backward sliding said slide.

3. A magnetic tape device comprising:

a pair of right and left guide plates;

a tape cassette moving table placed between said pair of right and left guide plates to be movable forward and backward;

a rocking lever engaged with said moving table;

a driving member;

a rotating member which is forward and reversely rotated by said driving member; and an interlocking mechanism by which said driving member and said rotating member are interlockingly connected to each other;

wherein said rocking lever is swung by said driving member via said rotating member and said interlocking mechanism to move said moving table forward and backward between a cassette inserting position and a cassette placing position;

wherein said interlocking mechanism has a slide plate which is placed to be slidable along one of said guide plates, and which is to be engaged respectively with said rotating member and said rocking lever; and wherein said slide plate includes a slide plate body which is placed along said guide plate; and a bent piece which is bent into a substantially L-like shape from a lower edge of said slide plate body to elongate toward said rotating member, and a rack which is engaged with a pinion formed on said rotating member is formed on said bent piece.

4. A magnetic tape device according to claim 3, wherein a slot which elongates along forward and backward directions is formed at a predetermined position in said slide plate body, a support piece which protrudes from said guide plate is passed through said slit, and a retaining portion which abuts against an outer side face of said slide plate body is disposed in a tip end portion of said support piece.

5. A magnetic tape device according to claim 3, wherein a recessed groove which is longitudinally formed in said bent piece is movably engaged with a lower edge portion of said guide plate.

6. A magnetic tape device according to claim 3, wherein a tip end of a door open lever which is pivotally attached to said one guide plate is engaged with a door of a tape cassette insertion port opposed to the cassette inserting position, an opening pin protrudes from said slide plate to be opposed to said door open lever, and said opening pin is engaged with said door open lever to open said door by forward and backward sliding said slide.

7. A magnetic tape device comprising:

a pair of right and left guide plates;

a tape cassette moving table placed between said pair of right and left guide plates to be movable forward and backward;

a rocking lever engaged with said moving table;

a driving member;

a rotating member which is forward and reversely rotated by said driving member; and an interlocking mechanism by which said driving member and said rotating member are interlockingly connected to each other;

wherein said rocking lever is swung by said driving member via said rotating member and said interlocking mechanism to move said moving table forward and backward between a cassette inserting position and a cassette placing position;

wherein said interlocking mechanism has a slide plate which is placed to be slidable along one of said guide plates, and which is to be engaged respectively with said rotating member and said rocking lever; and wherein an engaging hole which is to be engaged with an engaging pin protruding from said rocking lever is opened in said slide plate body, and said rocking lever is backward swung to backward move said moving table toward the cassette placing position by backward sliding said slide plate to cause a peripheral portion of said engaging hole to be engaged with said engaging pin.

8. A magnetic tape device according to claim 7, wherein a lift-preventing portion which, when said moving table is placed at the cassette placing position, abuts against or approaches an upper edge of said engaging pin is formed in said peripheral portion of said engaging hole.

9. A magnetic tape device according to claim 7, wherein a tip end of a door open lever which is pivotally attached to said one guide plate is engaged with a door of a tape cassette insertion port opposed to the cassette inserting position, an opening pin protrudes from said slide plate to be opposed to said door open lever, and said opening pin is engaged with said door open lever to open said door by forward and backward sliding slide.

10. A magnetic tape device comprising:

a pair of right and left guide plates;

a tape cassette moving table placed between said pair of right and left guide plates to be movable forward and backward;

a rocking lever engaged with said moving table;

a driving member;

a rotating member which is forward and reversely rotated by said driving member; and an interlocking mechanism by which said driving member and said rotating member are interlockingly connected to each other;

wherein said rocking lever is swung by said driving member via said rotating member and said interlocking mechanism to move said moving table forward and backward between a cassette inserting position and a cassette placing position;

wherein said interlocking mechanism has a slide plate which is placed to be slidable along one of said guide plates, and which is to be engaged respectively with said rotating member and said rocking lever; and wherein a lock lever which is engageable with said engaging pin is pivotally attached to said slide plate body, a lock groove is formed in a tip end portion of said lock lever, and, under a state where said lock lever is swung and said lock groove is opposed to said engaging pin across a gap of a predetermined distance, said slide plate is forward slid to cause said lock groove to be engaged with said engaging pin, thereby forward swinging said rocking lever to forward move said moving table toward the cassette inserting position.

11. A magnetic tape device according to claim 10, wherein an engaging spring which urges said lock lever toward said engaging pin is disposed, and a lock canceling piece which, when said moving table is forward moved to the cassette inserting position, is engaged with said lock lever against said engaging spring to separate said lock lever from said engaging pin protrudes from said one guide plate.

12. A magnetic tape device according to claim 10, wherein a tip end of a door open lever which is pivotally attached to said one guide plate is engaged with a door of a tape cassette insertion port opposed to the cassett inserting position, opening pin protrudes from said slide plate to be opposed to said door open lever, and said opening pin is engaged with said door open lever to open said door by forward and backward sliding said slide.

* * * * *